United States Patent
Holmes

(10) Patent No.: US 11,547,096 B2
(45) Date of Patent: Jan. 10, 2023

(54) INSERTABLE BEEHIVE ENTRANCE DEVICE

(71) Applicant: Richard Holmes, Staley, NC (US)

(72) Inventor: Richard Holmes, Staley, NC (US)

(*) Notice: Subject to any disclaimer, the term of this patent is extended or adjusted under 35 U.S.C. 154(b) by 53 days.

(21) Appl. No.: 16/996,596

(22) Filed: Aug. 18, 2020

(65) Prior Publication Data

US 2021/0100223 A1 Apr. 8, 2021

Related U.S. Application Data

(60) Provisional application No. 62/893,483, filed on Aug. 29, 2019.

(51) Int. Cl.
*A01K 51/00* (2006.01)
*A01K 47/06* (2006.01)

(52) U.S. Cl.
CPC .............. *A01K 51/00* (2013.01); *A01K 47/06* (2013.01)

(58) Field of Classification Search
CPC ......... A01K 47/00; A01K 47/06; A01K 51/00
USPC ................................................ 449/20, 23–25
See application file for complete search history.

(56) References Cited

U.S. PATENT DOCUMENTS

| | | | | |
|---|---|---|---|---|
| 128,070 A * | 6/1872 | Roberts | ............. | A01K 47/06 449/22 |
| 163,071 A * | 5/1875 | Hollis | ............. | A01K 47/06 449/22 |
| 346,023 A * | 7/1886 | Butler | ............. | A01K 47/06 449/23 |
| 509,438 A * | 11/1893 | Langdon | ............. | A01K 47/00 449/7 |
| 519,652 A * | 5/1894 | Taylor | ............. | A01K 47/06 449/25 |
| 917,900 A * | 4/1909 | Saffell | ............. | A01K 47/06 449/23 |
| 945,407 A * | 1/1910 | Nichols | ............. | A01K 47/06 449/23 |
| 1,462,711 A * | 7/1923 | Lovett | ............. | A01K 47/06 449/21 |
| 2,250,152 A * | 7/1941 | Clipp | ............. | A01M 1/02 449/22 |

(Continued)

FOREIGN PATENT DOCUMENTS

| | | | |
|---|---|---|---|
| KR | 200343501 Y1 * | 3/2004 | |
| KR | 20090089823 A * | 8/2009 | |

OTHER PUBLICATIONS

English-language translation of KR 200343501 Y1 (Year: 2004).*
English-language translation of KR 20090089823 (Year: 2009).*

*Primary Examiner* — Brady W Frazier

(57) ABSTRACT

An insertable beehive entrance device allowing entrance into the beehive and disrupting exit from the beehive in order to make the moving of honey bee hives to a new location less problematic. The device includes a base with an entrance opening and a two legs attached to the base forming a triangular frame, the frame forming an entrance at its apex. The frame includes a mesh top covering and a reflective bottom covering configured to be brighter than the inner hive. Once placed in the hive entrance it allows honey bees to enter the hive through the insertable device but disrupts their normal pattern of exit. Bees are now trapped in the hive making it simpler to move. When catching honey bee swarms, this device placed in the entrance makes coming back for the swarm box more convenient.

1 Claim, 2 Drawing Sheets

(56) References Cited

U.S. PATENT DOCUMENTS

| | | | | |
|---|---|---|---|---|
| 3,108,294 | A | * | 10/1963 | Brown, Jr. ............ A01K 47/06 449/23 |
| 4,229,848 | A | * | 10/1980 | Shaparew ............. A01K 47/06 449/23 |
| 5,348,511 | A | * | 9/1994 | Gross .................... A01K 47/06 449/2 |
| 2012/0077412 | A1 | * | 3/2012 | Put ........................ A01K 47/06 449/20 |

* cited by examiner

INSERTABLE BEEHIVE ENTRANCE DEVICE

CROSS REFERENCE

This invention was given provisional approval U.S. Ser. No. 62/983,483 on Aug. 29, 2019.

BACKGROUND

This invention pertains to bee keeping equipment, which will help to simplify the the necessary moving of bee hives. This may also be used to help bee keepers stop honey robbing by other hives.

PRIOR ART

N/A

SUMMARY

The invention was designed to make moving bee hives simpler. Bee keepers no longer have to wait until it is dark to have all the bees back in the hive to move it. It may also be used in cases of honey robbing where it's use will stop robbing by other hives.

Figure 1:
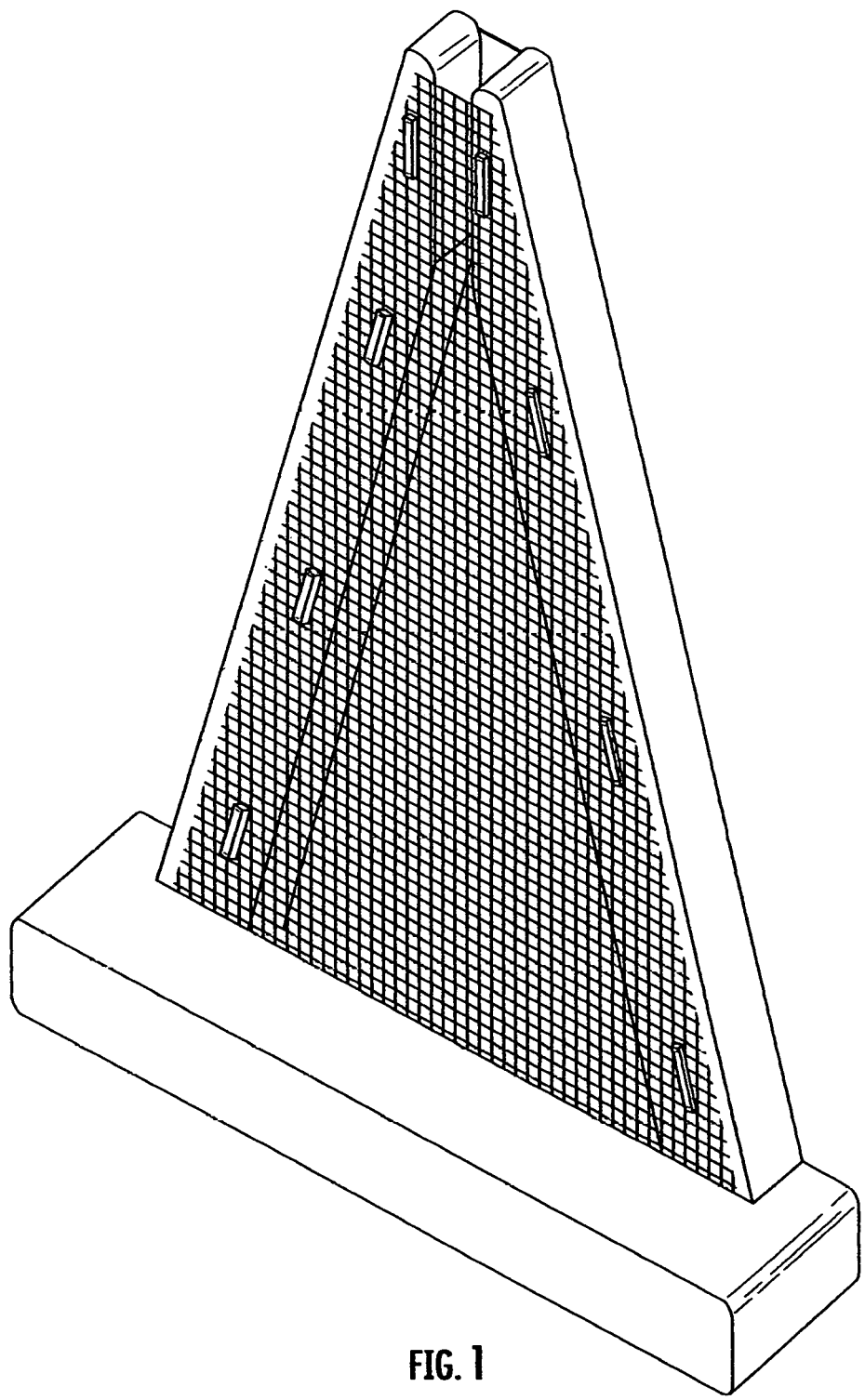
Figure 2:
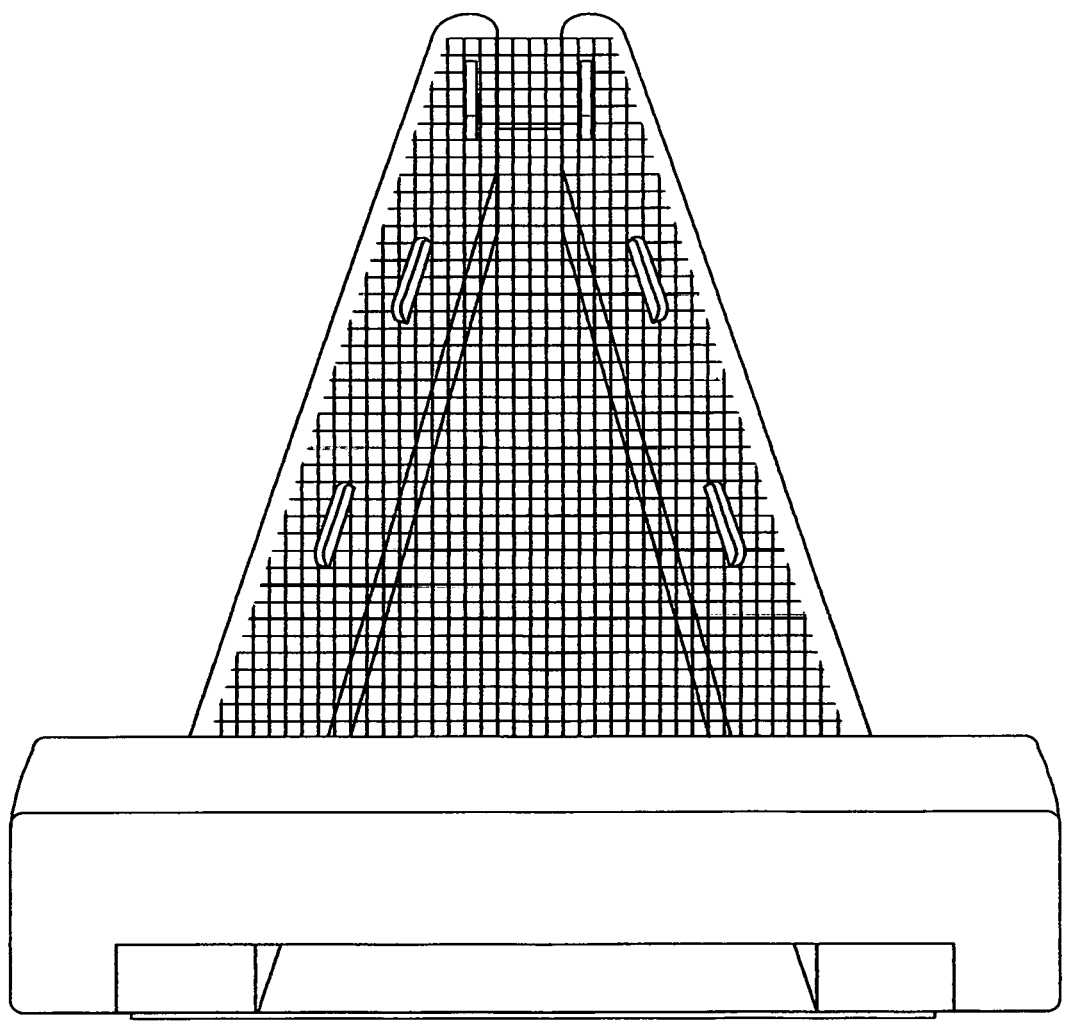

DESCRIPTION OF DRAWING sheet 1 of 2
FIG. 1 Holmes Trap In
top view
sheet 2 of 2
FIG. 2
front to back view

DETAILED DESCRIPTION

As seen in the drawings FIG. 1, and FIG. 2 this invention is a triangular shape made of pine wood, hard white vinyl, window screen and duo fast staples.

The wide end has an opening cut into it in which the legs of the triangle fit their squared end into each edge. The legs also have at the opposite end a taper to allow for a small opening at that end.

The wood frame triangle then has a hard white vinyl cut to fit the underside stapled to it.

This wood and vinyl frame will now have a section of window screen cut to fit the topside of the legs while snugged tightly to the wide end as well. The screen is now stapled to these.

This now forms a gateway for the honey bees to follow deeper into the hive box.

The screen allows fresh air and light to show inside the hive and draws bees to the large end rather then the bees returning to the darker area at the small opening effectively trapping them in the hive.

The materials used make the invention allow for air and light to help guide the bees, but are not solely limited to these exact materials to be effective. The width, height and length would be relatively simple to deduce by someone knowledgeable in the art.

The invention claimed is:
1. A device for trapping honey bees within a beehive, comprising:
   a frame comprising a base and two angled legs attached to the base, the frame forming a triangular shape;
   a top covering, attached to a top surface of the legs, formed of a screen mesh;
   a bottom covering, attached to a bottom surface of the legs, formed of a reflective material;
   wherein the base comprises a lengthwise slot configured as a honey bee entrance which additionally allows light and air into the beehive;
   wherein the angled legs form an opening at an apex of the triangular shape;
   wherein the device is configured such that the legs of the frame are removably insertable into a beehive such that the apex opening reaches into a dark environment of an inner portion of the beehive, while the base is configured to preclude insertion into the beehive due to a height of the base being higher than a height of the legs;
   wherein during operation, the lengthwise slot provides access to bees to enter the inner portion of the beehive and exit through the apex opening, and wherein the reflective bottom covering is configured to attract bees attempting to exit the hive, while the screen mesh is configured to prohibit bees from reaching the reflective bottom covering, thereby disrupting an exit of the bees through the apex opening so as to trap the bees within the beehive.

* * * * *